United States Patent [19]

Schatzberg

[11] Patent Number: 5,734,815
[45] Date of Patent: Mar. 31, 1998

[54] METHOD AND APPARATUS FOR EFFICIENT CYCLICAL REDUNDANCY CHECK (CRC) MAINTENANCE FOR SUB-SECTOR WRITES

[75] Inventor: Alon Schatzberg, North Andover, Mass.

[73] Assignee: EMC Corporation, Hopkinton, Mass.

[21] Appl. No.: 697,305

[22] Filed: Aug. 22, 1996

[51] Int. Cl.$^6$ ................................................. G06F 11/00
[52] U.S. Cl. .............................. 395/182.04; 395/182.03
[58] Field of Search ....................... 395/182.04, 182.03, 395/182.05, 441; 371/51.1, 40.1, 40.4

[56] References Cited

U.S. PATENT DOCUMENTS

| | | | |
|---|---|---|---|
| 5,235,601 | 8/1993 | Stallmo et al. | 371/40.1 |
| 5,337,322 | 8/1994 | Wang et al. | 371/51.1 |
| 5,485,598 | 1/1996 | Kashima et al. | 395/182.04 |
| 5,499,337 | 3/1996 | Gordon | 395/182.04 |
| 5,594,862 | 1/1997 | Winkler et al. | 395/182.03 |
| 5,613,059 | 3/1997 | Stallmo et al. | 395/182.04 |

*Primary Examiner*—Ly Hua
*Attorney, Agent, or Firm*—Mark J. Casey, Esq.; John M. Gunther, Esq.

[57] ABSTRACT

A method and apparatus are for maintaining a cyclic redundancy check (CRC) byte is described which eliminates additional input/output (I/O) transactions for the case when a write to a partial sector is required while the CRC byte is maintained for an entire sector. The method includes performing an XOR operation between the partial write data and the data it is to displace, and then performing an XOR operation between the old CRC byte associated with the sector and the result of the XOR operation between the partial write data and the data it is to displace.

5 Claims, 3 Drawing Sheets

METHOD AND APPARATUS FOR EFFICIENT CYCLICAL REDUNDANCY CHECK (CRC) MAINTENANCE FOR SUB-SECTOR WRITES

BACKGROUND OF THE INVENTION

This invention relates generally to storage systems typically associated with computer systems and more particularly to providing an efficient method for maintaining data integrity information associated with the data stored on the storage systems.

As is known in the art computer systems generally include a central processing unit, a memory subsystem, and a storage subsystem. According to a networked or enterprise model of a computer system the storage subsystem associated with or in addition to a local computer system may include a large number of independent storage devices or disks housed in a single enclosure. This array of storage devices is typically connected to several computers over a network. Such a model allows for the centralization of data which is to be shared among many users and also allows a single point of maintenance for the storage functions associated with computer systems.

Two factors which are important to the design of any mass storage subsystem are the ability of the system to deliver data or receive data quickly and the ability to deliver data and store data reliably. One method which has been employed to ensure the reliability of data stored to and delivered from a storage subsystem is the maintenance of cyclic redundancy check ("CRC") data for subsets of the data stored on the storage subsystem. CRC information is typically stored in the form of a single byte and is associated with several other bytes or larger amounts of data. The CRC byte is redundant information stored alongside the data and provides a means of assuring the validity of the data associated therewith. For example, when data are read the CRC byte is read as well and is compared to a newly calculate CRC byte associated with data read.

One type of storage subsystem such as the Symmetrix family of storage systems manufactured by EMC Corporation are configured such that data may be stored on a number of disk drives. The disk drives are formatted to create so called logical volumes. A single disk may contain several volumes and conversely, a single volume may span several disks. In either case, the logical volumes are then broken down into tracks which are further broken down into sectors. Each sector is then comprised of, for example, eight data blocks each, where each data block may typically include 512 bytes. Finally a byte is typically comprised of 8 bits of data. The tracks and sectors referred to above may be physical tracks and sectors on a magnetic platter or any other subdivision of data contained in a logical volume.

To ensure data integrity, systems such as the Symmetrix systems described above may maintain a CRC byte for each sector of data. The CRC byte is typically stored on the storage device (disk) and may also be stored in any cache memory associated with the storage system. Using the CRC information entails, for every read operation from disk or from a cache associated with a storage subsystem, recalculation and verification against the value which was stored with the data read. Additionally, when a write operation is performed, in addition to writing the data to cache and later writing it to disk, a CRC value is computed and updated for each sector which is written.

One drawback to maintaining a CRC byte for each sector and updating it for every write operation is that it requires additional overhead (i.e., input/output (I/O) operations) to perform the task. This problem is exacerbated when the smallest addressable data unit is, for example, a block of data while the CRC byte is maintained for groups of, for example, eight blocks (sectors). During operation of a computer system, there are occasions when a write operation includes data which will update only a portion of a sector. In this case, a CRC Value corresponding to the entire sector can not be computed solely from the data which is to be written from the host to the disks since the data from the entire sector is needed in order to calculate the CRC value.

Present day storage systems typically handle the above problem in one of two ways. The first way includes reading the rest of the associated sector (i.e. the unchanged data) from the disk into a memory (typically a cache), calculating a CRC value using the unchanged data plus the new data, and then writing the new data as well as the new CRC value to disk. As can be seen, this method requires an additional overhead I/O operations between the disk and the cache. A second method includes writing the new data to the disk and marking the CRC byte on the disk as invalid while maintaining partial CRC information in the cache (and usually on the disk as well) until a later time when the entire sector can be read into the cache for the purpose of calculating the corresponding CRC byte which is subsequently written to disk.

It is clear from the above description that at least one extra I/O operation is necessary for the sole purpose of updating the CRC information associated with a write event which performs a write operation which includes updating only a portion of a sector. The extra input/output operation is the one used to read the remaining data from the sector prior to calculating a new CRC byte. Although systems which maintain CRC information provide for increased reliability and data integrity, there is a speed penalty paid because of the additional I/O required to maintain the CRC byte. It would be advantageous therefore to provide a system which allows for the maintenance of a CRC byte while not incurring the additional input/output processing overhead.

SUMMARY OF THE INVENTION

According to one aspect of the present invention, a method of maintaining integrity information associated with stored data includes the following steps. First, data which is to be written onto the storage device is received by a storage controller. Here, the data to be written may be less than the amount of data for which the integrity information, i.e. cyclic redundancy check (CRC) byte, is maintained. In a single input/output (I/O) transaction, the data is transferred to the storage device and a value which corresponds to the performance of a bit by bit XOR operation between the data and the data to be displaced on the storage device is returned to the storage controller. After the value is received by the storage controller, another XOR operation is performed on a bit by bit basis between the returned value and the old CRC byte associated with the larger amount of data. The result of the second XOR operation represents the CRC value for the larger amount of data, including the newly written section. With such a method, an additional read operation previously required to update the CRC byte is eliminated. The CRC byte obtained by following the above described method is exactly equal to a value which would be obtained by writing the new section of data to the storage device, reading the entire larger section (including the new data) of data back to the controller, and performing a CRC calculation on the entire large section of data.

In accordance with another aspect of the present invention, an apparatus is provided for maintaining a cyclic redundancy check (CRC) byte for writes of data to a storage device where the data to be written is a subset of the data associated with the CRC byte. The apparatus includes a controller for receiving the data to be written to the storage device. The apparatus further includes means which, in a single input/output transaction, transmits the data to the storage device, performs an XOR operation, on a bit by bit basis, between said transmitted data and data to be displaced by the transmitted data, and returns to the controller, new data corresponding to the results of the XOR operation. The apparatus further includes logic means for performing a second XOR operation, on a bit by bit basis, between the data returned to the controller and the CRC byte to provide a new CRC byte. With such an arrangement, a CRC byte associated with a large section of data may be updated without requiring an additional data read of the storage device even when the data to be written is a subset of the data for which the CRC byte is maintained. This is possible since the CRC value provided by the above described apparatus is exactly equal to a value as would be obtained by writing the new data to the storage device, reading the entire large section of data back to the controller, and performing a CRC calculation on the entire large section of data.

BRIEF DESCRIPTION OF THE DRAWINGS

The above and further advantages of the present invention may be better understood by referring to the following description taken in conjunction with the accompanying drawings in which.

DETAILED DESCRIPTION OF THE PREFERRED EMBODIMENT

Figure 1:
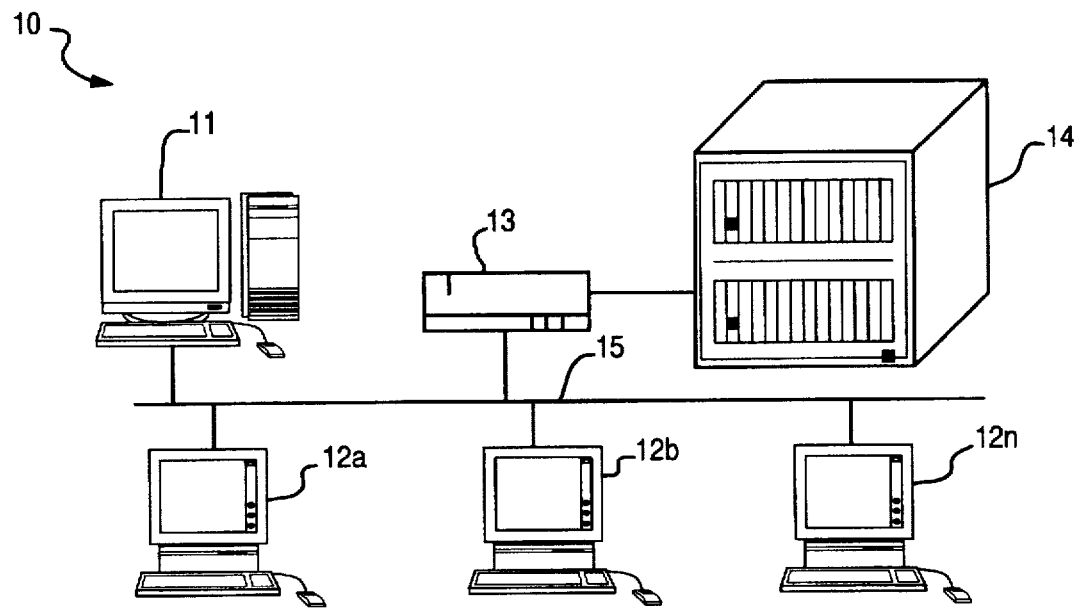
FIG. 1 is a block diagram representation of a networked computer system.

Referring now to FIG. 1, network computer system 10 is shown to include, inter alia, computers 11 and 12a through 12n coupled to server 13 via network 15. Computers 11 and 12a–12n may be any one of several well known types of computers such as personal computers or workstations. Server 13 is further coupled to storage system 14 thereby providing a link between individual computers 11 and 12 to storage system 14 via server 13. Like many network computer systems, server 13 typically provides the scheduling and routing of data between any of the individual computers 11 and 12 and disk storage subsystem 14 as well as between individual computers 11 and 12 themselves. Storage subsystem 14 may include several individual storage devices such as magnetic disks as well as controller cards and cache memory housed within a single enclosure. For purposes of discussion the preferred embodiment will be described according to the notion that storage elements included in storage system 14 are magnetic disks. It should be noted however that the storage elements could be any storage medium which allows for storage and retrieval of data (for example random access memory, or magnetic tape, or optical disks), and thus should not be seen as a limitation of the present invention.

Figure 2:
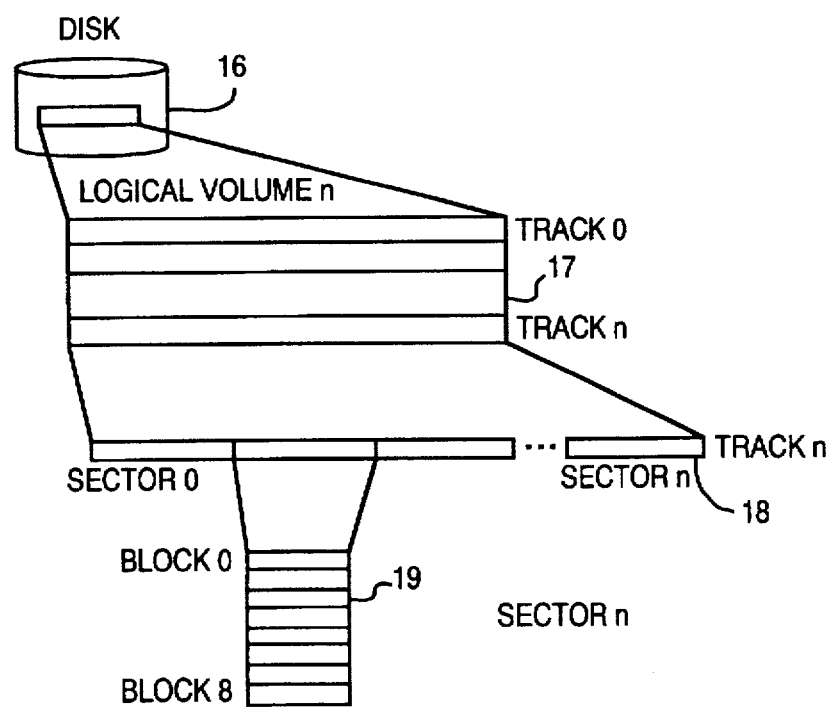
FIG. 2 is a diagrammatic representation of the segmentation of data on one of the disks of the disk storage system of FIG. 1.
Figure 3:
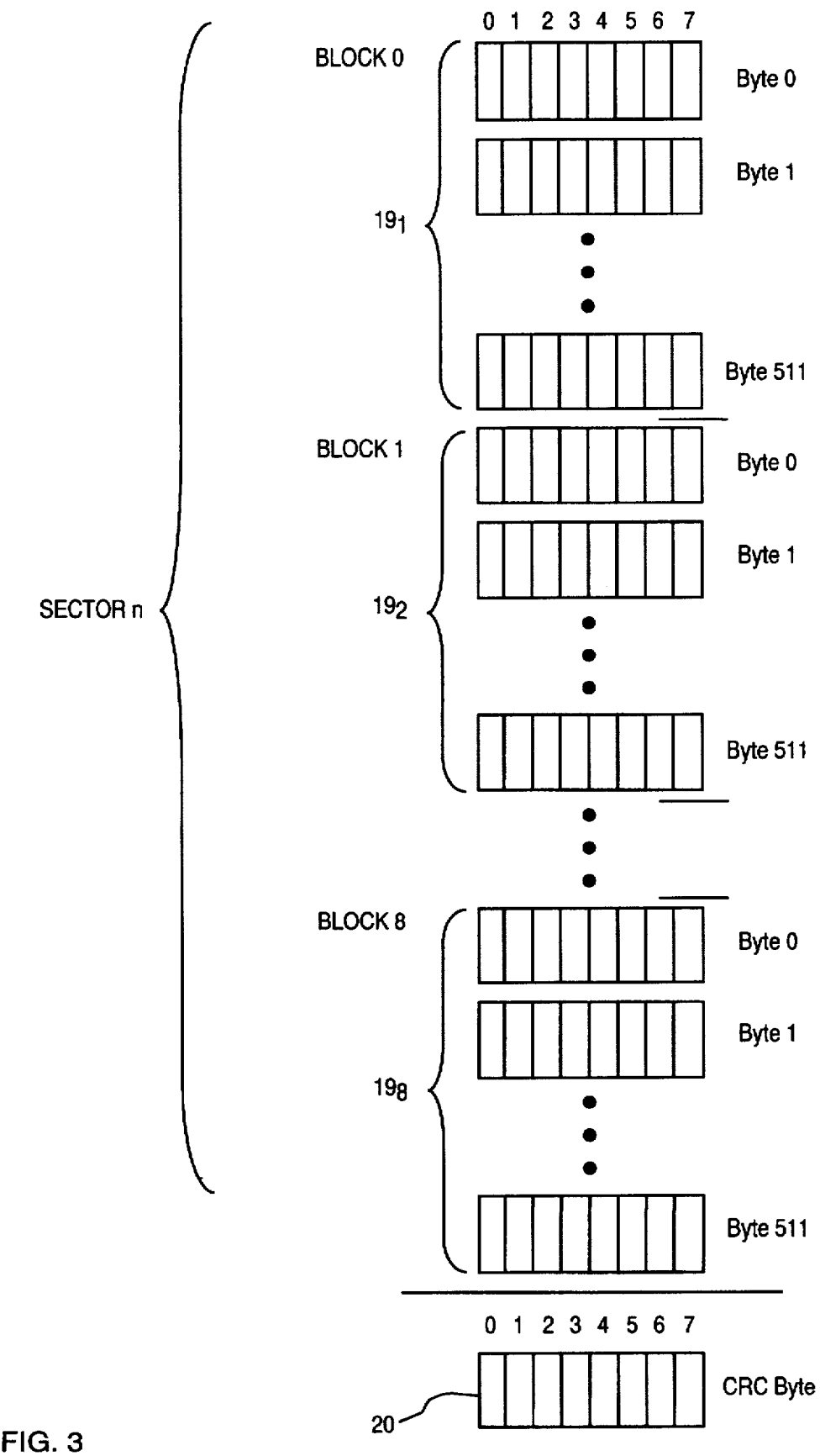
FIG. 3 is a diagrammatic representation of the segmentation of data of one of the sectors of FIG. 2.

Referring now to FIG. 2 and according to a preferred embodiment of the present invention, disk 16, which is here an exemplary one of the several disks of storage system 14 (FIG. 1), is shown as having its storage locations segmented into a plurality of logical volumes 17. The logical volume segmentation is used by the application programs associated with computer systems 11 and 12 to identify where data is stored on the disk. The logical volumes 17 are further divided into a plurality of tracks 18, here labeled track zero through track n, which are then further segmented into a plurality of sectors 19, here labeled sector 0 through section n. The sectors are then further segmented into a plurality of blocks. Here each sector is comprised of eight blocks which, as will be described below in connection with FIG. 3, are further broken down into groups of 512 bytes. It should be understood that the segmentation of disk 16 as shown here is for illustration purposes only and does not constitute a limitation of the present invention. That is, disk 16 may itself by a single logical volume or it may include several logical volumes or may be one of several disks which make up a logical volume. In addition, each sector may include more or fewer blocks than shown in FIG. 2. The concept of the present invention is extensible to any arrangement or segmentation of data on a storage device.

Referring now to FIG. 3. Sector n which here is an exemplary one of the sectors 18 is shown to include several blocks $19_i$ through $19_n$ where here, for illustration purposes, n is equal to eight. Each block 19 is shown to further include 512 bytes labeled Byte 0 through Byte 511. For each of the sectors 18, a CRC byte 20 is maintained which may be used to verify the integrity of data read from and written to the associated sector (on the associated storage device). Each byte of blocks 19 here includes eight individual bits labeled 0 through 7. Likewise, CRC byte 20 also includes eight bits labeled 0 through 7. The data contained in the CRC byte is representative of a bit by bit XOR operation for each corresponding bit in each byte of each block of a single sector. That is, for example, bit zero of CRC byte 20 is the value obtained by performing an XOR operation between bit 0 of byte 0 of block 0 with bit 0 of byte 1 of block 0 and then taking the resultant value performing an XOR operation between it and bit 0 of byte 2 of block 0 and so on through bit 0 of byte 511 of block 8. The same operation is carried out on bits 1 through 7 and, as one of skill in the art will recognize, could be accomplished for all bits<0:7> in parallel using an appropriate arrangement of logic gates. It should be understood that the CRC byte 20 is stored along with the other data in each sector in each track in each volume on disk 16. Additionally, a copy of the CRC byte 20 for each sector of each disk of storage system 14 is stored in a cache memory (not shown) associated with storage system 14 (FIG. 1) and as will be discussed below provides a means of verifying the integrity data read from or written to disk 16.

During a read operation, as may be requested by one of the computer systems 12 (FIG. 1), a controller (not shown) associated with storage system 14 may cause the requested data to be transferred (i.e. read) from one of the associated disks to its own temporary storage buffers (if that data is not already resident in cache). In addition, any CRC bytes associated with the sectors of data read will also be transferred from the disk to the controller. Before the data is passed onto the requesting computer system, a CRC byte for each sector associated with the data read from disk will be recalculated and compared with the CRC byte stored on the disk (i.e. read from disk). When the recalculated CRC byte matches to stored CRC byte, it is known that the data passed the integrity test and is likely to be correct. The data may then be passed onto the requesting device. Should the recalculated CRC byte not match the stored CRC byte 20, it is known that an error has occurred in the reading of the data and as a result the erroneous data will not be passed onto the requesting device. At this point any of several well known error recovery methods may be employed or a simple return of an error message may be used to indicate that there was a problem with the requested data During the operation of any of computer systems 11 or 12 of FIG. 1, the need to write data to storage system 14 will often arise. Although as shown in FIG. 3 a CRC byte is maintained for each sector of each track of each logical volume, the write operation requested by one of the computer systems 11 or 12 does not always include enough data to fill an entire sector. In accordance with the present invention, a method of writing less than a sector's worth of data to a storage device while updating the CRC byte associated with the entire sector including the data associated with the partial write, without requiring additional I/O operations, is hereby presented.

Figure 4:
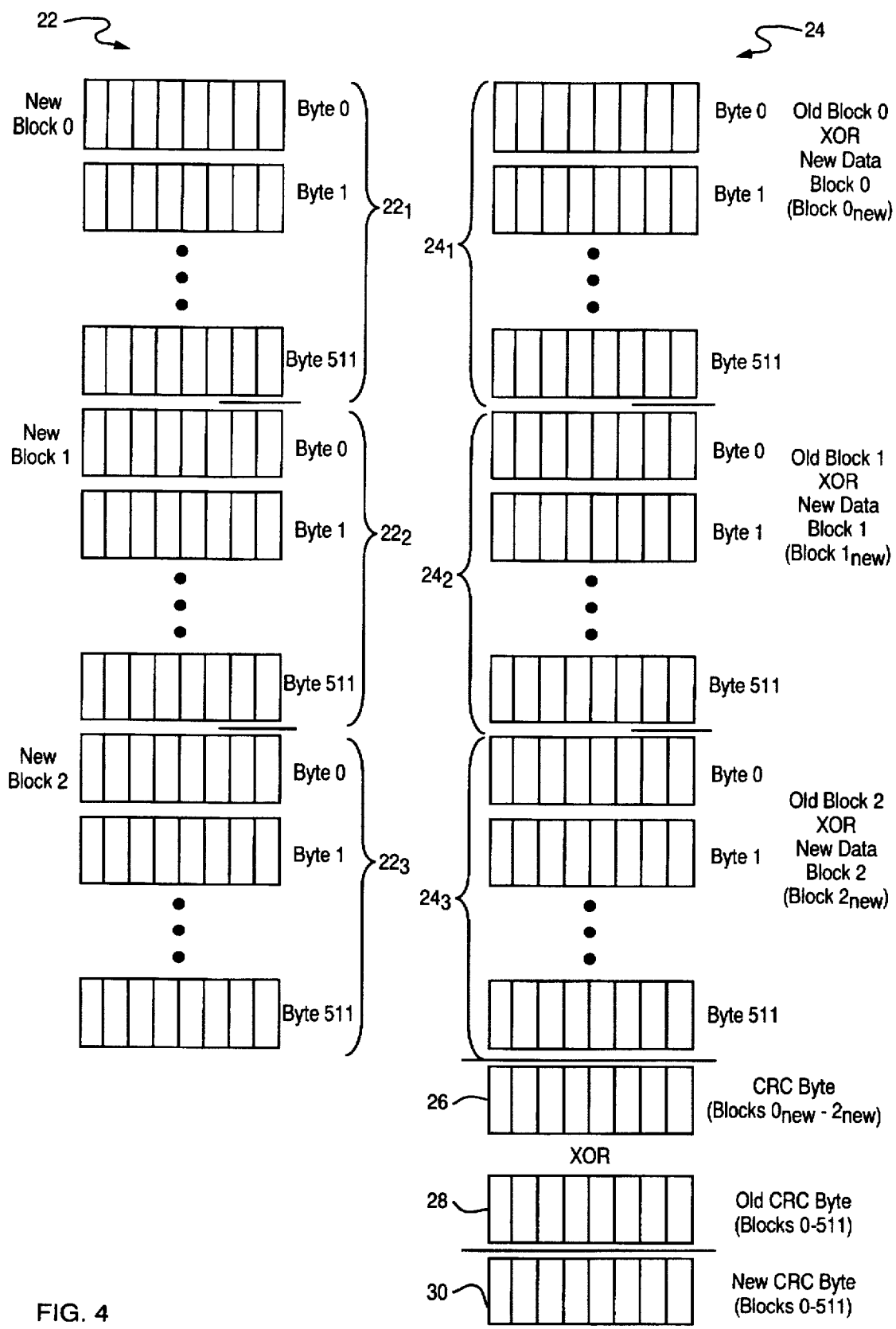
FIG. 4 is a diagram showing the calculation of the CRC byte for a partial sector write.

Referring now to FIG. 4, new data 22 which is to be written to one of the disks of storage system 14 is shown to include several blocks $22_t$ through $22_n$, where here n is equal to three. It should be understood that the partial write here shown to include three blocks is for illustration purposes only and should not be seen as a limitation of the present invention. Indeed, the concepts described below are applicable to writes of blocks of any size where the CRC byte is maintained for an amount of data larger than the amount of data written. In addition to the new data blocks 22, also shown in FIG. 4 is temporary storage 24 which also includes three blocks $24_t$ through $24_n$, where here again, n is equal to three. In accordance with the present invention, the data in storage 24 represents, on a comparative bit by bit basis, a value obtained by performing an XOR operation between the new data 22 and the old data which was stored in the corresponding blocks 19 (FIG. 3) and read to a buffer in the controller.

Further in accordance with the present invention, new data 22 is written to the target disk while, in the same I/O operation, the values for storage into storage 24 are returned from the disk. That is, the disk device includes hardware for performing an XOR operation. As a result, the value of the new data XORed with the old data may be returned in the same I/O operation in which the new data is written to the target disk. It will be appreciated that by returning the XORed data within the same I/O operation used to write the new data to the target disk, the previously required read transaction of the rest of the sector is eliminated. Once the data obtained by XORing the old data blocks with the new data blocks is placed in temporary storage 24, a new CRC byte for the updated sector still needs to be calculated using the partial data. As will be described in detail below, the new CRC byte is calculated using the new data stored in temporary storage 24 along with the old CRC byte 28.

To provide the new CRC byte for the sector, the following steps are performed. A new CRC byte 26 is calculated on a bit by bit basis on the data stored in blocks $24_t$–$24_n$. The CRC calculation is performed as described above in connection with FIG. 3. That is, bit 0 of byte 0 of block $24_t$ will be XORed with bit 0 of byte 1 of block $24_1$ and continuing on through bit 0 byte 511 of block $24_n$. The result of the XOR operations are stored in bit 0 of CRC byte 26. Similarly that same XOR operations are carried out for bits<1:7> for blocks $24_t$–$24_n$ with the results stored in corresponding bits<1:7> of CRC byte 26. Once CRC byte 26 has been calculated, that value is then XORed, on a bit by bit basis, with the old CRC byte 28 (i.e. CRC byte 20 of FIG. 3) which is typically kept in the storage system cache (as well as on the disk), and represents the CRC byte of the old data of blocks $19_1$ through $19_8$ (block zero through block eight, FIG. 3). The result of the XOR calculation is then stored in a new CRC byte 30 with the new CRC byte replacing the old CRC byte 20 (FIG. 3). This new CRC byte may be maintained in the cache as well as being stored on the storage device. It will be appreciated that the resultant value stored in CRC byte 30, achieved by calculating the CRC byte for the new data XORed with the old data and then XORing it with the CRC byte associated with the old data (i.e. the old CRC byte for the sector) yields a value that is exactly equivalent to a CRC value as would be achieved by writing the new data into the corresponding blocks $19_1$ through $19_8$ and then performing a CRC calculation on the entire sector. It can be seen then that a new CRC byte for a particular sector may be calculated without the need for additional I/O operations, even when a full sector write is not being performed. By providing such a method, the present invention avoids the necessity of reading the remaining sector from the disk on a less than full sector write in order to calculate the CRC byte. As a result, additional I/O operations are eliminated and a substantial performance increase in the overall operation of storage system 14 (FIG. 1) is achieved.

It should be understood that the concepts described above in connection with the maintenance of a CRC byte for data stored on disks of a disk storage system are equally applicable when the storage medium is a random access memory or any other storage device having read/write capability. Thus the description given above with respect to disk storage is only given for illustration and should not be seen as a limitation of the concepts of the present invention.

Having described a preferred embodiment of the present invention it will now become apparent to those of skill in the art that other embodiments incorporating its concepts may be provided. It is felt therefore, that this invention should not be limited to the disclosed embodiment but rather should be limited only by the spirit and scope of the appended claims.

What is claimed is:

1. A method of maintaining integrity information associated with stored data comprising the steps of:

receiving first data to be written to a storage medium, where said first data is intended to replace second data previously stored on said storage medium and wherein said second data is a subset of third data which has associated therewith a first integrity value;

in a single transaction,
writing said first data to said storage medium;
performing an XOR logic operation on a bit by corresponding bit basis between said first data and said second data to produce an intermediate value; and determining a second integrity value for said intermediate value; and performing an XOR logic operation on a bit by corresponding bit basis between said first integrity value and said second integrity value.

2. The method as in claim 1 wherein said first integrity value is cyclic redundancy check (CRC) information of a single byte and is obtained by performing, on a bit by bit basis, XOR operations for corresponding bits of said third data.

3. The method as in claim 2 wherein said second integrity value is an intermediate CRC byte and is obtained by performing, on a bit by bit basis, XOR operations for corresponding bits of said intermediate value.

4. An apparatus for maintaining a cyclic redundancy check (CRC) byte for data being written to a storage device wherein said data is a subset of the data associated with said CRC byte comprising:

controller means for receiving data to be written to said storage device;

means for, in a single input/output transaction, transmitting said data to said storage device, performing an XOR operation, on a bit by bit basis, between said transmitted data and data to be displaced by said transmitted data, and returning to said controller means, new data corresponding to said performance of said XOR operation;

means for performing an XOR operation, on a bit by bit basis, between said new data and said CRC byte to provide a new CRC byte.

5. The apparatus as in claim 4 wherein said storage device is operable to performing said XOR operation, between said transmitted data and said data to be displaced by said transmitted data.

* * * * *